(12) United States Patent
Bouchez et al.

(10) Patent No.: US 10,870,362 B2
(45) Date of Patent: Dec. 22, 2020

(54) METHOD FOR CHARGING AN ELECTRICAL ENERGY STORAGE UNIT AND VOLTAGE CONVERTER

(71) Applicant: Valeo Siemens eAutomotive France SAS, Cergy (FR)

(72) Inventors: Boris Bouchez, Cergy (FR); Bruno Condamin, Pontoise (FR); Pierre-Alexandre Chauvenet, Cergy (FR)

(73) Assignee: VALEO SIEMENS EAUTOMOTIVE FRANCE SAS, Cergy (FR)

( * ) Notice: Subject to any disclaimer, the term of this patent is extended or adjusted under 35 U.S.C. 154(b) by 376 days.

(21) Appl. No.: 15/739,368

(22) PCT Filed: Jun. 23, 2016

(86) PCT No.: PCT/FR2016/051551
§ 371 (c)(1),
(2) Date: Dec. 22, 2017

(87) PCT Pub. No.: WO2016/207562
PCT Pub. Date: Dec. 29, 2016

(65) Prior Publication Data
US 2018/0191188 A1 Jul. 5, 2018

(30) Foreign Application Priority Data
Jun. 24, 2015 (FR) ...................... 15 55801

(51) Int. Cl.
*B60L 53/14* (2019.01)
*H02M 3/158* (2006.01)
(Continued)

(52) U.S. Cl.
CPC ................ *B60L 53/14* (2019.02); *H02J 7/00* (2013.01); *H02J 7/022* (2013.01);
(Continued)

(58) Field of Classification Search
CPC .......... B60L 53/14; H02M 3/1584; H02J 7/00
(Continued)

(56) References Cited

U.S. PATENT DOCUMENTS 10,562,404 B1 * 2/2020 Khaligh ................. B60L 53/24
2009/0196072 A1 * 8/2009 Ye ........................ H02M 7/493
363/17

FOREIGN PATENT DOCUMENTS

| FR | 2990310 A1 | 11/2013 |
| FR | 2992492 A1 | 12/2013 |
| FR | 3013166 A1 | 5/2015 |

OTHER PUBLICATIONS

International Search Report for Application No. PCT/FR2016/051551 dated Sep. 12, 2016.

* cited by examiner

*Primary Examiner* — Richard V Muralidar
(74) *Attorney, Agent, or Firm* — McCormick, Paulding & Huber PLLC

(57) ABSTRACT

The invention concerns a method for charging an electrical energy storage unit, in particular installed in a vehicle, from a continuous charging terminal, using a DC/DC voltage converter to adapt the voltage between said continuous charging terminal and said electrical energy storage unit, said DC/DC voltage converter comprising at least two interleaved cells operating out of phase, each cell having respective switches; said method comprising control of the switches of said DC/DC voltage converter by pulse width modulation with a duty cycle to adapt the voltage between said continuous charging terminal and the electrical energy storage unit, said duty cycle having a given value $\alpha_v$ that is substantially constant over several interleaving cycles.

7 Claims, 2 Drawing Sheets

(51) Int. Cl.
 *H02J 7/00* (2006.01)
 *H02J 7/02* (2016.01)
(52) U.S. Cl.
 CPC ....... *H02M 3/1584* (2013.01); *B60L 2210/14* (2013.01); *H02J 2207/20* (2020.01); *H02M 2003/1586* (2013.01)
(58) Field of Classification Search
 USPC .......................................................... 320/109
 See application file for complete search history.

METHOD FOR CHARGING AN ELECTRICAL ENERGY STORAGE UNIT AND VOLTAGE CONVERTER

CROSS REFERENCE TO RELATED APPLICATION

This application is a National Stage application of International Patent Application No. PCT/FR2016/051551, filed on Jun. 23, 2016, which claims priority to French Patent Application No. 1555801, filed on Jun. 24, 2015, each of which is hereby incorporated by reference in its entirety.

TECHNICAL FIELD

The invention relates to a method for charging an electrical energy storage unit, in particular installed in a vehicle, from a continuous charging terminal. The invention also relates to a DC/DC voltage converter. In particular, the voltage converter is configured to adapt the voltage between a continuous charging terminal and an electrical energy storage unit, in particular installed in a vehicle.

BACKGROUND OF THE INVENTION

Vehicles with a solely electrical motorisation or with electrical motorisation combined with another type of motorisation (hybrid vehicles) typically include a high-voltage battery, for example having a voltage of about 400V, which delivers electrical energy to drive a motor configured to move the vehicle. In certain vehicles, such a battery can be recharged using an electrical network outside the vehicle. It is known to use a charging terminal designed to deliver an energy that is formatted for charging the battery, for example with sufficient power to allow for a fast charge. Charging terminals that deliver an AC voltage and charging terminals that deliver a DC voltage are known, referred to hereinafter as "continuous charging terminals". Typically, continuous charging terminals include a unit that regulates the charge.

Continuous charging terminals are generally designed to charge with a power of about 50 kw batteries that have a maximum charging voltage of between 250 and 550V approximately. A battery that has a voltage included within this voltage range can be connected directly to the charging terminal, via optionally an electronic filter. However, the battery of the vehicle can have a maximum charging voltage outside of the range accepted by the charging terminal. Indeed, a manufacturer can provide a battery with a higher maximum charging voltage in order to limit the currents in the phases of the electric motor, which among other things reduces the section of the electrical cables. A DC/DC voltage converter (or DCDC converter) can then be used to adapt the voltage between the continuous charging terminal and the battery of the vehicle. However, the converter can create disturbances on the continuous charging terminal due to the switchings of the switches of the DCDC converter.

A method for charging an electrical energy storage unit is as such sought, such as a battery of a vehicle, from a continuous charging terminal wherein the use of a DCDC converter between the continuous charging terminal and the storage unit results in low disturbances on the charging terminal, even not at all.

OBJECT OF THE INVENTION

To this effect, the invention relates to a method for charging an electrical energy storage unit, in particular installed in a vehicle, from a continuous charging terminal using a DC/DC voltage converter to adapt the voltage between said continuous charging terminal and said electrical energy storage unit, said DC/DC converter comprising at least two interleaved cells operating out of phase, each cell having respective switches;

said method comprising control of the switches of said DC/DC voltage converter by pulse width modulation with a duty cycle to adapt the voltage between said continuous charging terminal and the electrical energy storage unit, said duty cycle having a given value that is substantially constant over several consecutive interleaving cycles, in particular over the entire duration of the charge.

In particular, the interleaving cycle corresponds to the product between the number of cells of the DC/DC voltage converter and the duration in time of the phase shift between two successive cells. In particular, the energy storage unit has a full-charge voltage that is higher than the operating range of the charging terminal.

The current at a connection point of the DC/DC voltage converter with the charging terminal has current ripples that are more or less substantial according to the duty cycle of the DC/DC voltage converter. The current ripples intervene at a frequency which is a function of the number of cells and of the switching frequency of the DC/DC converter. These current ripples can propagate in components of the charging terminal, such as inductances or capacitors of the charging terminal. When the duty cycle varies, the current ripples vary which modifies the disturbances in the charging terminal. By operating with a substantially constant duty cycle value, it is ensured that the disturbances remain constant in the charging terminal which facilitates compliance with the standards of continuous charging terminals. Furthermore, this also simplifies the regulation in the charging method because there is no voltage regulation to be carried out, only a fixed duty cycle to apply.

According to an embodiment, the given value $\alpha_v$ of the duty cycle is equal to the product of the inverse of the number N of cells of the DC/DC voltage converter by a natural number X, in particular less than N. As such, the given value $\alpha_v$ of the duty cycle corresponds to one of the values defined by the relation $$\alpha_v = \frac{X}{N}$$

where N is the number of interleaved cells and X is a natural number, in particular less than N.

At these duty cycle values, the current ripples at the connection point between the charging terminal and the DC/DC voltage converter are substantially attenuated, even suppressed, which makes it possible to comply with the standards of use of continuous charging terminals. As such, it is ensured that the disturbances in the continuous charging terminal which are due to the current ripples at the connection point between the continuous charging terminal and the DC/DC voltage converter are substantially attenuated, even suppressed during the charging of the electrical energy storage unit. In particular, the current ripples are reduced to a level between 0 and 5%, even between 0 and 2.5%, and even between 0 and 1% in standardised values. Consequently, the size of the filter that makes it possible to respect what the continuous charging terminal can support can be minimized because the ripples are weak. Even if the disturbances are sufficiently low, the use of a filter can be avoided.

This allows for savings in volume and in cost of the DC/DC converter, particularly for a DC/DC converter of which the components have a power of about 50 kW or 100 kW, even 150 kw or more.

According to an embodiment, said given value of the duty cycle is substantially equal to 50% when the DC/DC voltage converter comprises an even number of cells.

At a duty cycle value of 50%, the current ripples are attenuated regardless of the number of cells of the DC/DC converter provided that the number is even. As such, the method can be implemented with different DC/DC converters without modifying a step of the latter, which makes it possible to simplify the method according to the invention.

According to an embodiment, said duty cycle has said given substantially constant value $\alpha_v$, when the voltage of the electrical energy storage unit is greater than a first threshold and/or less than a second threshold, with said thresholds being according to an operating range of the continuous charging terminal.

During the charging of the energy storage unit, the voltage increases at its terminals which also leads to an increase in the voltage at the connection point between the continuous charging terminal and the DC/DC voltage converter. By having a fixed duty cycle over several interleaving cycles, even over the entire charging period, there is a linear relationship between the voltage of the electrical energy storage unit and the voltage at the continuous charging terminal, in particular at the connection point between the continuous charging terminal and the DC/DC converter. As such, the regulation of the continuous charging terminal can be carried out without taking into account the fact that the energy storage unit is outside of, or within, the operating range of the charging terminal. For the charging terminal everything occurs as if the latter had an electrical storage unit of which the voltage is within its operating range. The continuous charging terminal sees the vehicle as if the latter contained an energy storage unit, in particular a battery, of the usual voltage but with a capacitor $1/\alpha_v$. There are therefore no modifications to be made on the terminal in order to adapt it to the storage unit. Terminals that are already installed therefore do not require any modification to be compatible with the storage unit even if the latter is outside of the operating range of the continuous charging terminal. Only the current demand sent by the vehicle, has to be adapted in order to obtain a suitable voltage ratio.

By ensuring that the voltage of the electrical energy storage unit remains greater than the first threshold and/or less than the second threshold, it is verified that keeping the duty cycle constant does not result in a voltage at the connection point that would damage the continuous charging terminal.

According to an alternative of this embodiment, the duty cycle of the DC/DC voltage converter is modified, when the voltage of the electrical energy storage unit is greater than the second threshold. In particular, when the voltage of the energy storage unit has exceeded said second threshold, the tension at the connection point between the continuous charging terminal and the DC/DC voltage converter is kept less than or equal to a maximum voltage of the continuous charging terminal by varying the duty cycle of the DC/DC voltage converter. In particular, the duty cycle decreases in such a way as to decrease the voltage at said connection point.

According to an embodiment, the duty cycle of the DC/DC voltage converter is equal to 1, when the voltage of the electrical energy storage unit is less than the first threshold. As such, if the voltage of the storage unit is so low that the voltage at the connection point between the continuous charging terminal and the DC/DC converter is less than a minimum operating voltage, the charge of the storage unit is even so ensured by keeping the switches of the DC/DC voltage converter closed. In particular, the switches are closed until the voltage of the storage unit becomes greater than or equal to the first threshold.

According to an embodiment, the first threshold S1 and/or the second threshold S2 are given by the relationships: $S1=V_{B\ min}\times\alpha_v$, $S2=V_{B\ max}\times\alpha_v$, where $V_{B\ max}$ is a maximum permissible voltage by the continuous charging terminal and $V_{B\ min}$ is a minimum permissible voltage by the continuous charging terminal.

The invention further relates to a DC/DC voltage converter, in particular configured to adapt the voltage between an electrical unit connected as input, in particular a continuous charging terminal, and an electrical unit as output, in particular an electrical energy storage unit, comprising:

at least two interleaved cells configured to operate in phase shift, with each cell having respective switches;

a control unit configured to control said switches by pulse width modulation with a duty cycle to adapt the voltage between the electrical unit as input and the electrical unit as output, with a duty cycle having a given value that is substantially constant over several interleaving cycles. In particular, the electrical energy storage unit is onboard a vehicle.

The DC/DC voltage converter according to the invention can comprise a control unit configured to implement any one of the characteristics described hereinabove in relation with the method according to the invention.

According to an embodiment, the control unit comprises a comparator configured to compare the voltage at a connection point with the voltage of the electrical unit as output divided by the value $\alpha_v$, in such a way as to lock the duty cycle of the converter to the given value $\alpha_v$.

BRIEF DESCRIPTION OF THE DRAWINGS

The invention shall be described more precisely by referring to the figures, which show the description and do not constitute a limitation to the scope of the invention, and wherein.

Figure 1:
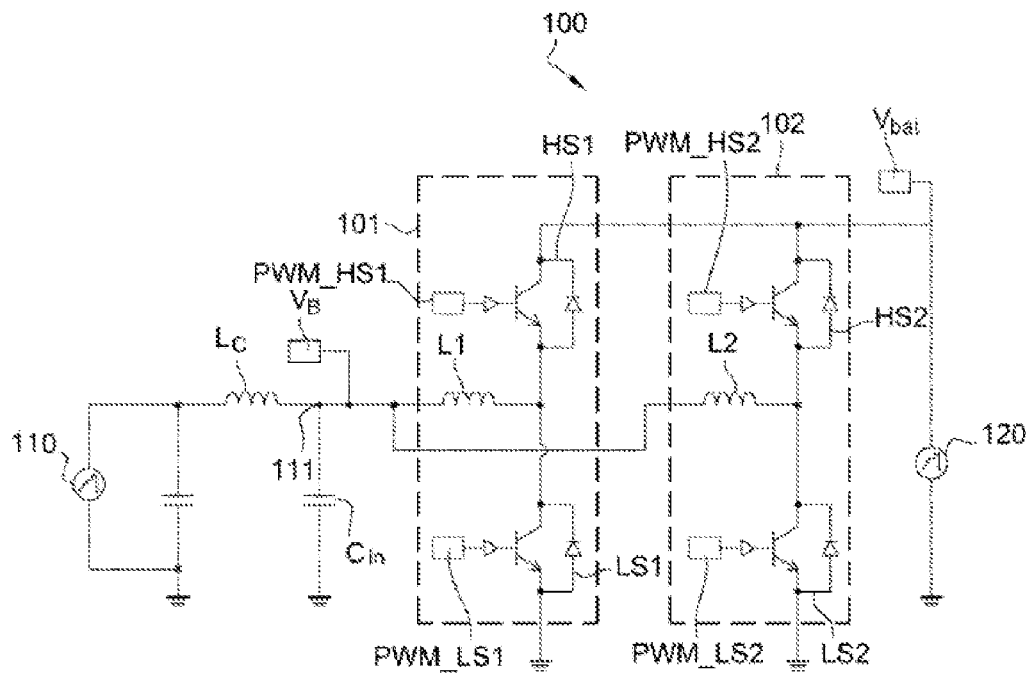
FIG. 1 shows an example of a circuit wherein the charging method according to the invention is implemented.

The method according to the invention will be understood better when reference is made to FIG. 1.

DETAILED DESCRIPTION OF THE INVENTION

A DC/DC voltage converter 100 is used to adapt the voltage between a continuous charging terminal 110 and a battery 120, because the battery 120 has a full-charge voltage that is higher than the operating range of the charging terminal. In particular, the battery 120 can have a full-charge voltage of 800V, and the charging terminal can be designed to deliver a voltage between 250 and 500V, in particular at a power of 50 kw, 100 kW or 150 kw, even more. In the example of FIG. 1, the battery 120 could be another type of electrical energy storage unit. The battery 120 is onboard a vehicle in order to supply an electric motor which drives the displacement of the vehicle.

According to an alternative, the DC/DC voltage converter 100 comprises two cells 101, 102. The cells 101, 102 include respectively an arm which comprises a "high side" switch HS1, HS2 connected to the positive terminal of the battery 120 and a "low side" switch LS1, LS2 connected to the earth of the battery 120. The two switches are connected in series. In each cell, an inductance L1, L2 has one end connected to the common terminal of the high side and low side switched. The example of FIG. 1 could have another configuration of cells. For example, each cell could have a configuration as a full bridge. In particular, the converter 100 is of the boost type in order to increase the voltage delivered by the charging terminal 110 in order to supply the battery 120.

The switches of the DC/DC voltage converter 100 can be transistors, in particular field effect transistors. The transistors can be of the MOSFET type (acronym for "Metal Oxide Semiconductor Field Effect Transistor").

The DC/DC voltage converter 100 comprises a control unit configured to control the switches. During the charging of the battery 120 by the charging terminal 110, the switches are controlled by pulse width modulation with a duty cycle α to adapt the voltage of the charging terminal 110 to that of the battery 120. The cells operate in phase shift with an interleaving in order to limit the current ripples at the connection point 111 between the DC/DC converter 100 and the charging terminal 110. During the charging method, the duty cycle α has a substantially constant value $\alpha_v$. In particular, the duty cycle α can remain constant over several consecutive interleaving cycles. This makes it possible to always obtain the same current ripples at the connection point 111, which simplified the elimination of these ripples by a filter for example (not shown). The current ripples intervene at a frequency which is a function of the number of cells of the converter and of the switching frequency of the converter. In the example shown in FIG. 1, when the switching frequency is 20 kHz, the frequency of the ripples is 2×20 kHz=40 kHz. The switching frequency can be defined during the design of the converter, it is generally between 5 and 200 kHz.

Figure 2:
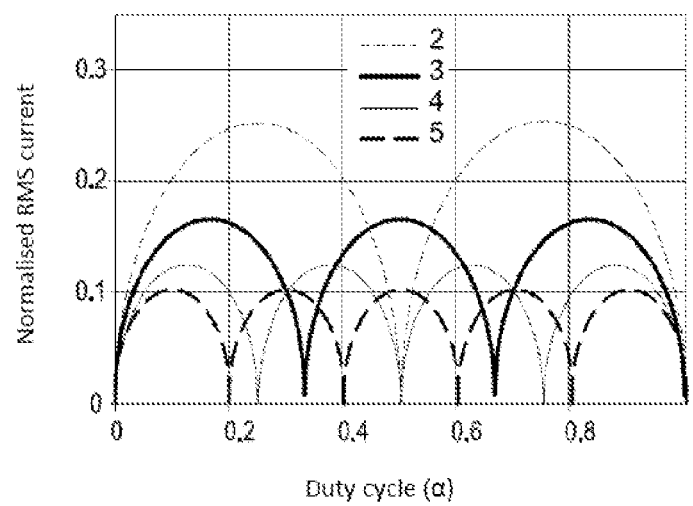
FIG. 2 shows the current in standardised value according to the duty cycle in a DC/DC converter that has 2, 3, 4 or 5 interleaving cells.

FIG. 2 described the rate of normalised RMS current at the connection point 111 according to the duty cycle α for DC/DC voltage converters that have 2, 3, 4 or 5 cells. It is observed that in correctly choosing the duty cycle α of the cells of the converter, it is possible to substantially reduce, and even entirely suppress, the current ripples at the connection point 111.

According to an alternative of the example shown in FIG. 1, the duty cycle α remains substantially equal to a value $$\frac{x}{N}$$

where N is the number of interleaving cells of the converter 100 and X is a natural number, greater than or equal to 1 and less than N. In particular, in FIG. 1, the DC/DC converter 100 comprises two interleaved cells 101, 102. The duty cycle α is then equal to 0.5. For duty cycles α of values $$\frac{x}{N}$$

the current ripples produced by the switches HS1, HS2, LS1, LS2 are very low, even zero. In particular, the current ripples can have a standardised value less than 2.5%. For example, for an average current of 125 A at the connection point 111, the peak current, i.e. the difference between the maximum value of the current and the minimum value, is between 2 and 3 A.

In particular, the duty cycle α can be equal to 0.5 for a DC/DC voltage converter that has an even number of cells because the duty cycle value 0.5 attenuates the current ripples for these converters. As such, the same charging method can be implemented for different DC/DC voltage converters used.

Figure 3:
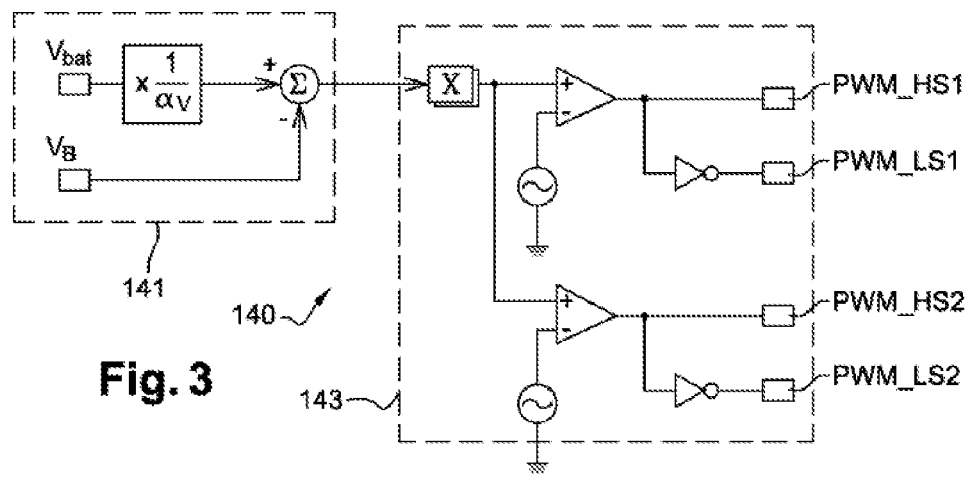
FIG. 3 shows an alternative of the method according to the invention.

According to an alternative, keeping the duty cycle α at the value $\alpha_v$ can be carried out by locking the voltage $V_B$ at the connection point 111 to the voltage $V_{BAT}$ at the terminals of the electrical storage unit 120 divided by the value $\alpha_v$. To this effect, the DC/DC voltage converter 100 can comprise a unit 140 shown in FIG. 3. The unit 140 comprises a comparator 141 that compares the voltage $V_B$ at the connection point 111 with the voltage $V_{BAT}$ of the battery 120 divided by the value $\alpha_v$. A unit 143 then determines the duty cycle α according to the result of the comparison and delivers the modulation signals PWM_HS1, PWM_LS1, PWM_HS2, PWM_LS2 to the switches HS1, HL1, HS2, HL2 of the converter 100. As such, the duty cycle delivered to the switches HS1, HL1, HS2, HL2 will be equal to the given value $\alpha_v$.

The voltage $V_{BAT}$ of the battery 120 increases progressively during the charging method in order to reach a predefined full charge level, for example 800V. The voltage $V_B$ at the connection point 111 increases in correlation with the voltage $V_{BAT}$ of the battery 120. For example, when the duty cycle α is equal to 0.5, the voltage $V_B$ at the connection point 111 is equal to half of the voltage $V_{BAT}$ of the battery 120. When the continuous charging terminal 110 is designed to deliver a voltage included in a given range, for example between 250 and 500V, a higher voltage at the connection point 111 can damage the continuous charging terminal 110. Excessive voltage at the connection point 111 can appear if the battery 120 has a full-charge voltage greater than $\alpha_v \times V_{B\ max}$, where $V_{B\ max}$ is the maximum permissible voltage by the continuous charging terminal. Likewise, a voltage less than the minimum permissible voltage $V_{B\ min}$ by the continuous charging terminal 110 can appear at the connection point 111, if the battery 120 has a full-charge voltage less than $\alpha_v \times V_{B\ min}$.

In order to overcome these situations, according to an alternative, the duty cycle α remains constant at the given value $\alpha_v$, in particular with $$\alpha_v = \frac{x}{N}$$

as described hereinabove, when the voltage $V_{BAT}$ of the battery 120 is greater than a first threshold S1 and less than a second threshold S2. In particular, the first threshold S1 is equal to $\alpha_v \times V_{B\ min}$ and the second threshold S2 is equal to $\alpha_v \times V_{B\ max}$. But other threshold values S1, S2 can be chosen. For example, the first threshold S1 can be greater than $\alpha_v \times V_{B\ min}$ or the second threshold S2 can be smaller than $\alpha_v \times V_{B\ max}$ in order to ensure that the operating range of the continuous charging terminal 110 is never exceeded. In the example shown in FIG. 1, a single condition on the thresholds S1, S2 could be used, for example when the full-charge voltage of the battery 120 is known to be sufficiently large or small.

Figure 4:
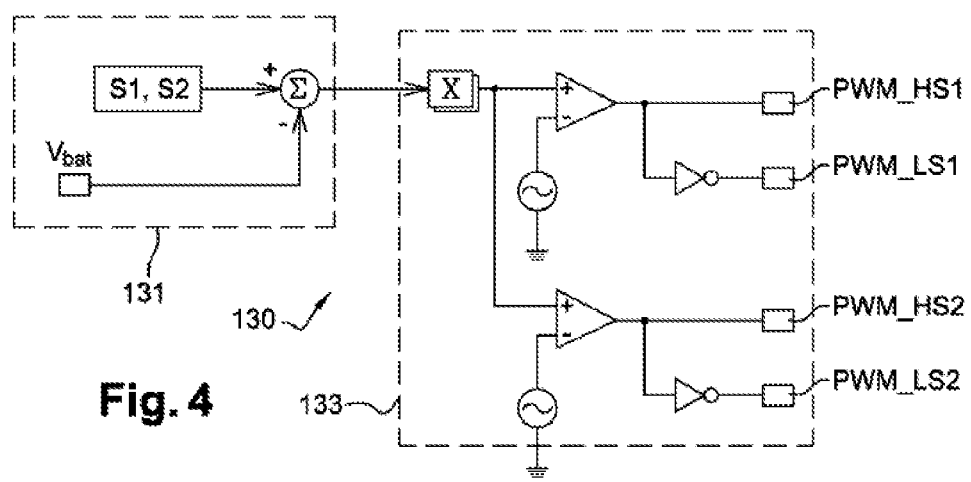
FIG. 4 shows another alternative of the method according to the invention.

In a particular example of this alternative, if the voltage $V_{BAT}$ of the battery 120 is less than the first threshold S1, the duty cycle of the DC/DC voltage converter 100 is equal to 1. As such, the switches HS1, HL1, HS2, HL2 of the converter 100 are kept closed. The battery 120 sees a voltage substantially equal to the voltage at the connection point 111. If the voltage $V_{BAT}$ of the battery 120 exceeds the second threshold S2, the duty cycle α no longer remains constant. The duty cycle α is modified in order to keep the voltage $V_B$ at the connection point 111 within the operating range of the charging terminal 110. In this case, the duty cycle α can be decreased in order to reduce the voltage $V_B$ at the connection point 111, in particular for a DC/DC converter 100 of the boost type. In this particular example, the DC/DC voltage converter 100 can comprise a unit 130 shown in FIG. 4. The unit 130 comprises a comparator 131 that compares the voltage $V_{BAT}$ of the battery 120 with the thresholds S1, S2 and a unit 133 that determines the duty cycle α according to the result of the comparison and delivers the modulation signals PWM_HS1, PWM_LS1, PWM_HS2, PWM_LS2 to the switches HS1, HL1, HS2, HL2 of the converter 100.

As shown in FIG. 1, the DC/DC voltage converter 100 can comprise a capacitor Cin which makes it possible to be compatible with a continuous charging terminal which is a source of current. In FIG. 1, the inductance Lc corresponds to the inductance of a cable that connects the converter 101. An electronic filter can be the interface between the continuous charging terminal 110 and the DC/DC voltage converter 100. The connection point 111 can then correspond at the connection point between the continuous charging terminal 110 and the electronic filter, or at the connection point between the electronic filter and the DC/DC voltage converter 100.

The invention is not limited to only the examples or alternatives described hereinabove, in particular the latter can be combined together. In particular, the DC/DC voltage converter 100 can be a combined supply and charging device such as described in European patent applications EP2367704 and EP2367705, and the charging method according to the invention can comprise steps described in these patent applications. This is in particular the case when the inductances L1, L2 correspond to phases of the motor of the vehicle.

The invention claimed is:

1. A method for charging an electrical energy storage unit, in particular installed in a vehicle, from a continuous charging terminal using a DC/DC voltage converter to adapt the voltage between said continuous charging terminal and said electrical energy storage unit said DC/DC voltage converter comprising at least two interleaved cells operating out of phase, each cell having respective switches; said method comprising a control by pulse width modulation of the switches of said DC/DC voltage converter with a duty cycle to adapt the voltage between said continuous charging terminal and the electrical energy storage unit, said duty cycle having a given value αv that is substantially constant over several consecutive interleaving cycles,
   wherein said duty cycle has said given value αv that is substantially constant, when the voltage of the electrical energy storage unit is greater than a first threshold and/or less than a second threshold, said thresholds being according to an operating range of the continuous charging terminal.

2. The method according to claim 1, wherein the given value αv of the duty cycle is equal to the product of the inverse of the number of cells of the DC/DC voltage converter by a natural number.

3. The method according to claim 1, wherein said given value αv of the duty cycle is substantially equal to 50% when the DC/DC voltage converter comprises an even number of cells.

4. The method according to claim 1, wherein the duty cycle of the DC/DC voltage converter is modified, when the voltage of the electrical energy storage unit is greater than the second threshold.

5. The method according to claim 1, wherein the duty cycle of the DC/DC voltage converter is equal to 1, when the voltage of the electrical energy storage unit is less than the first threshold.

6. The method according to claim 1, wherein the first threshold S1 and/or the second threshold S2 are given by the relationships:
   S1=VB min X∝v, S2=VB max X∝w, where VB max is a maximum permissible voltage by the continuous charging terminal and VB min is a minimum permissible voltage by the continuous charging terminal.

7. A DC/DC voltage converter, configured to adapt the voltage between an electrical unit connected as input, in particular a continuous charging terminal, and an electrical unit as output, in particular an electrical energy storage unit, comprising:
   at least two interleaved cells configured to operate in phase shift, with each cell having respective switches;
   a control unit configured to control by pulse width modulation said switches with a duty cycle to adapt the voltage between the electrical unit as input and the electrical unit as output, with a duty cycle having a given value αv that is substantially constant over several interleaving cycles,
   wherein the control unit comprises a comparator configured to compare the voltage at a connection point with the voltage of the electrical unit as output divided by the value αv, in such a way as to lock the duty cycle of the converter to the given value αv.

* * * * *

UNITED STATES PATENT AND TRADEMARK OFFICE
CERTIFICATE OF CORRECTION

PATENT NO.       : 10,870,362 B2
APPLICATION NO.  : 15/739368
DATED            : December 22, 2020
INVENTOR(S)      : Boris Bouchez et al.

Page 1 of 1

It is certified that error appears in the above-identified patent and that said Letters Patent is hereby corrected as shown below:

In the Claims

Column 8, Claim 6, Line 33, please delete "S1 = VB min X $\propto$ v, S2 = VB max X $\propto$ w, where VB max is a maximum permissible voltage by the continuous charging terminal and VB min is a minimum permissible voltage by the continuous charging terminal,"

And replace with -- S1 = VBmin X $\propto$ v, S2 = VBmax X $\propto$ v, where VBmax is a maximum permissible voltage by the continuous charging terminal and VBmin is a minimum permissible voltage by the continuous charging terminal --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*